United States Patent [19]

Jovanovic

[11] Patent Number: 4,731,251

[45] Date of Patent: Mar. 15, 1988

[54] METHOD OF AND APPARATUS FOR COOKING OF FOODS

[76] Inventor: Dragomir Jovanovic, 6, Impasse Jean-Moulin, Pont-de-Claix, France

[21] Appl. No.: 877,989

[22] Filed: Jun. 24, 1986

[51] Int. Cl.$^4$ .......................... A23L 1/01; A21B 2/00
[52] U.S. Cl. ..................................... 426/243; 99/447; 99/451; 219/405; 219/411; 426/523
[58] Field of Search ............... 426/243, 508, 509, 523; 99/369, 447, 451; 219/405, 411, 349

[56] References Cited

U.S. PATENT DOCUMENTS

| | | | |
|---|---|---|---|
| 3,304,406 | 2/1967 | King et al. | 219/411 |
| 3,414,709 | 12/1968 | Tricault | 99/451 |
| 4,406,218 | 9/1983 | Hatakeyama | 99/447 |
| 4,575,616 | 3/1986 | Bergendal | 219/411 |

FOREIGN PATENT DOCUMENTS 1199565 12/1959 France .
1596525 6/1970 France .

Primary Examiner—George Yeung
Attorney, Agent, or Firm—Karl F. Ross; Herbert Dubno

[57] ABSTRACT

A method of and a device for cooking foodstuff in which an infrared transparent receptacle having a central rise on which the food is positioned has a peripheral trough in which water can be provided. The food is cooked by a combination of direct infrared irradiation and repeated evaporation/condensation cycles which ensure optimum penetration of heat contributed by latent heat of condensation, directly to the interior of the food.

4 Claims, 6 Drawing Figures

METHOD OF AND APPARATUS FOR COOKING OF FOODS

FIELD OF THE INVENTION

My present invention relates to a method of or process for cooking a foodstuff, and to a cooking apparatus for carrying out this method or process, utilizing infrared radiation as the source of heat, but obtaining effects which are quite different from those involved in standard infrared broiling.

BACKGROUND OF THE INVENTION

For food cooking, various techniques have been developed to date and these include the use of an oven with or without a grill, a classical casserole or a steamer pot, a frying pan or a microwave oven.

Each of these devices provides for various cooking possibilities and each may be used for a particular foodstuff depending upon its structure, the way in which it is to be prepared, whether it is frozen or not and whether it is fresh or dried.

To allow all of the various techniques of cooking to be used at one location, e.g. a home or a foodstuff establishment, thus requires considerable investment.

In many of the devices used heretofore to cook foods, the thermal yield is minimal and the apparatus is considered to have poor efficiency, wasting comparatively large amounts of heat. This loss of heat can be a result of convective flow of heat away from the site at which the thermal energy can be used efficiently, radiant loss of heat and conductive loss, e.g. to structures having a high thermal inertia.

A variety of difficulties are also encountered in the cleaning of such cooking apparatus.

French Pat. No. 1,596,525 and U.S. Pat. No. 3,414,709 describe processes and devices for reheating of culinary platters utilizing two infrared radiation sources spaced apart and defining between them a space in which the closed and sealed receptacle for the platter can be received. This receptacle is composed of a material which is transparent or permeable to infrared rays. Because of the construction of these devices, the infrared energy is transmitted exclusively by radiation to the food or is directed upon the food and the receptacle to heat the food exclusively in the first case and both the receptacle and the food in the second case. However, these systems are not amenable to true cooking of foodstuffs and certainly cannot be used for a wide variety of foodstuffs and cooking preparation in a wide variety of ways. A universally applicable approach to cooking, for example, is not suggested in this patent.

OBJECTS OF THE INVENTION

It is therefore the principal object of the present invention to provide an improved cooking method or process which will overcome drawbacks of earlier techniques, particularly by reducing cleanup to a minimum, increasing the thermal efficiency of the cooking process, and allowing a single apparatus for cooking a variety of foodstuffs.

Another object of the invention is to provide an apparatus for carrying out the method and in particular, an apparatus which will allow a unique cooking technique to be practiced.

It is yet another object of my invention to provide a cooking process which can be utilized for substantially all foodstuffs, whatever their structure, their state or their mode of preparation and which consumes significantly less energy than traditional processes, while assuring rapid cooking and permitting cooking without the addition of grease or oil and with or without glazing.

SUMMARY OF THE INVENTION

These objects and others which will become apparent hereinafter are attained, in accordance with the invention, by cooking the foodstuff in the presence of a measured amount of water utilizing a combination of surface treatment of the foodstuff with infrared rays and a cooking by steam treatment of the foodstuff utilizing steam vaporized in a closed receptacle containing the foodstuff and a measured amount of water such that a multiplicity of vaporization/condensation cycles is effected in the receptacle with the vaporization of the water resulting substantially exclusively by activation of the water molecules by the infrared radiation.

The foodstuff is preferably disposed on a raised portion of the receptacle between two infrared radiators disposed above and below the receptacle and operating at an infrared emission frequency which can be "tuned" to the radiation frequency of the water molecule so that substantially the only energy which brings about the evaporation of the water is the infrared radiation of suitable wave length.

The peripheral trough around the raised portion of the floor of the receptacle contains the water which, upon evaporation, does the cooking and the repetitive cycles result from condensation of the steam produced which transfers latent heat of condensation to the foodstuff, the water being evaporated again so that it can be in a position to repeatedly transfer heat to the foodstuff by the automatic vaporization condensation cycles.

The penetrating heat from the condensing steam heats food through the thickness thereof until the surface temperature of 100° C. is reached on the foodstuff.

According to the apparatus aspects of the invention, the sealed receptacle can be formed by a top and a bottom which are similar in cross section, i.e. provided with raised portions surrounded by water receiving troughs, the trough in the cover being utilized as a water storage trough when it is inverted and utilized as a support for the foodstuff.

After cooking to the desired degree with the repetitive evaporation/condensation cycles, the cover can be removed and infrared roasting or brazing can be effected to glaze the surface of the foodstuff.

With the process of the invention, the foodstuff disposed on the raised surface of the bottom of the receptacle is progressively cooked by coaction of two processes for the transfer of heat to the foodstuff. On the one hand the foodstuff is cooked by the direct radiative heat transfer of infrared radiation through the infrared transparent walls of the receptacle and resulting in an infrared surface heating thereof.

On the other hand, the foodstuff is cooked by the conductive transfer of condensation heat from the body of water introduced into the receptacle and originally disposed in and substantially collecting in the trough surrounding the raised portion of the bottom of the receptacle and any additional moisture which may be released by the infrared direct radiation into the sealed receptacle since the evaporation of the water results exclusively from the absorption of the infrared energy by the water, the steam can be at a relatively high temperature and can effect cooking in depth of the foodstuff.

A significant amount of the evaporation is evaporation of water droplets, the greatest proportion of which may be on the foodstuff and formed by condensation. The recondensation of such vaporized water on the surface of the foodstuff creates the evaporation/condensation cycling described with particularly effective heat penetration into the foodstuff although its temperature may not be raised excessively.

By selecting the quantity of water which is introduced and the power of the infrared radiation sources between which the receptacle is provided, one can control the relative heat contributions by the direct radiation and the evaporation/condensation cycling. In fact, the brazing of the surfaces can even be effected with the receptacle closed by the infrared direct irradiation of the foodstuff in all cases.

The apparatus of the invention can comprise a closed receptacle of a material which is transparent or permeable to infrared radiation and including an upwardly open bottom part and a cover tightly fitting together, two radiation sources which are spaced apart and are juxtaposed with one another on a common support or carrier and between which, on a surface provided by the carrier, the receptacle containing the foodstuff can be disposed. The space between the radiation sources and surrounding the receptacle can be opened to the atmosphere. Means can be provided for controlling the duration of heating and the cadence with which the radiation sources are supplied with electrical energy.

In this device, each infrared radiation source is energized to emit infrared radiation of high density, capable of transforming the water in the receptacle and in the foodstuff to water vapor, the bottom of the receptacle being formed with the aforementioned trough to receive the water and form a storage compartment therefor.

Advantageously the receptacle is provided with a rack serving as its support between the radiation sources and having handles which are outside the fields of radiation from the sources and preferably which are inclined away from the receptacle carried thereby. The rack can cooperate with means on the support for the heaters for accurately positioning a receptacle on the rack spacedly between the two infrared sources.

The rack which is only heated by conduction from the receptacle, therefore can nevertheless be carried by the handles which are located outside the cooking space and thus can be used to place the receptacle on a table for serving. If immediate serving is not desired, the heat capacity of the receptacle can be such that its stored energy suffices to keep the foodstuff hot.

Thus, the method of cooking the foodstuff can comprise the steps of:
  introducing the foodstuff into a vessel having an upwardly open infrared transparent bottom portion formed with a central rise upon which the foodstuff is disposed and surrounded peripherally by a trough adjoining a side wall of the bottom portion of the vessel;
  introducing a predetermined amount of water into the trough;
  closing the vessel with a downwardly concave infrared transparent cover having a planar portion closely juxtaposed with the foodstuff and substantially coextensive with the rise and surrounded peripherally with a downwardly extending side wall substantially contiguous with the side wall of the bottom portion; and
  placing the closed vessel between two infrared radiating members at least coextensive with the vessel and subjecting the foodstuff to infrared irradiation through the vessel of a radiation power and frequency sufficient to bring water in the trough to a boil, thereby causing in repetitive evaporation/condensation cycles water to evaporate exclusively from infrared molecular activation and to condense on the foodstuff, cooking of the foodstuff by the in-depth penetration of heat into the foodstuff by the liberation of cooking heat with the condensation on the foodstuff, and superficial cooking of the foodstuff by the infrared irradiation directly.

Similarly the apparatus can comprise:
  a movable vessel for receiving a foodstuff to be cooked, the vessel comprising:
    an upwardly open infrared-radiation transparent bottom portion formed with a central rise upon which the foodstuff can be disposed, and surrounded peripherally by a trough adapted to receive a predetermined quantity of water at the inception of cooking,
    a downwardly concave infrared-radiation transparent cover having a planar portion adapted to be closely superposed with a foodstuff positioned on the rise and substantially coextensive therewith and surrounded peripherally by a side wall spaced from the foodstuff and substantially contiguous with a peripheral side wall of the bottom portion, the cover being closely fitted onto the bottom portion, and
    handles on at least the bottom portion of the vessel;
  a heating unit comprising:
    a lower infrared heater provided with at least one electrically operated infrared radiating member and at least coextensive with the bottom portion,
    an upper infrared heater provided with at least one electrically operated infrared radiating member spacedly juxtaposed with the lower heater and at least coextensive with the cover, and
    means supporting the vessel between the heaters in spaced relationship therefrom with the handles outside heating action zones of the heaters; and
    means for electrically energizing the members at a power and frequency sufficient to cause water in the vessel to boil and for a duration sufficient at least to cook the foodstuff on the rise superficially directly by infrared radiation, while simultaneously cooking the foodstuff in depth by heat released by condensation of steam on the foodstuff resulting from evaporation/condensation cycles induced by the infrared radiation.

Each of the heaters can comprise a prismatic casing open toward the prismatic casing of the other heater, a respective reflector received in each casing, and means mounting the respective member in juxtaposition with the respective reflector, the apparatus further comprising a common support for the casings The handles can be formed on stirrups extending upwardly from a support frame at opposite ends thereof, the frame having along opposite longitudinal sides thereof respective upstanding formations for retaining the bottom portion on the frame, each of the stirrups having a rod-like foot slidably guided on selected ledges on the lower heater for vertically positioning the vessel between the heaters.

BRIEF DESCRIPTION OF THE DRAWING

The above and other objects, features and advantages of the present invention will become more readily apparent from the following description, reference being made to the accompanying drawing in which.

SPECIFIC DE3SCRIPTION

Figure 1:
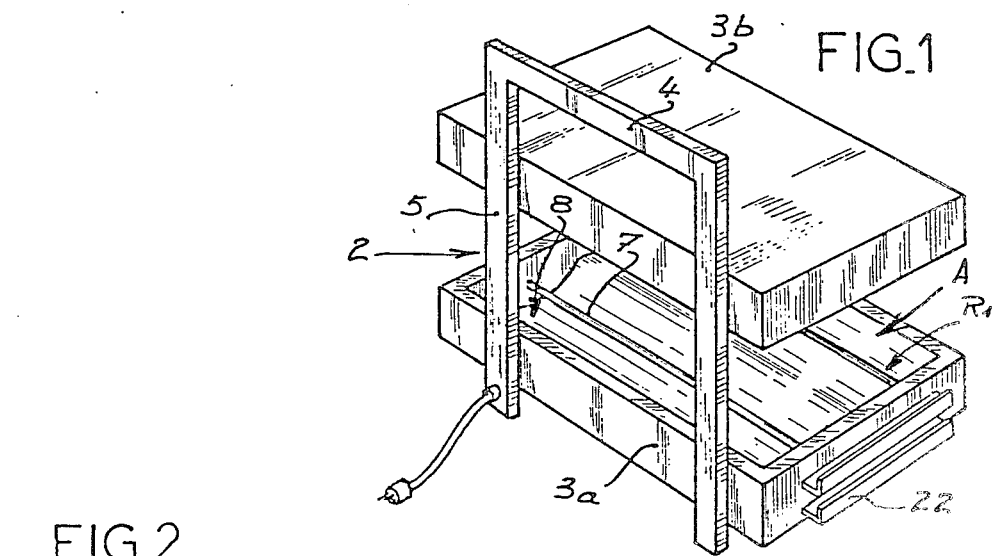
FIG. 1 is a perspective view from the rear of the apparatus of the invention in accordance with the first embodiment thereof, the receptacle and its rack having been removed.

In the embodiment illustrated in FIGS. 1–4, the apparatus comprises a support 2 or upon which two box-like housings 3a and 3b are mounted, forming lower and upper housings respectively and defining between them a cooking zone A.

The support 2 can be formed by a tubular profile element bent into or welded in a U-shape, whose cross bar 4 is disposed horizontally and forms the upper member of this support so that it can be a handle enabling the apparatus to be moved from place to place.

The shanks of the U are vertical and have lower ends forming feet which together with a third foot 6 supports the apparatus on a table or counter top with the housing 3a spaced above this surface. The foot 6 can be disposed on the underside of the housing 3a at a location midway between the feet formed by the shanks 5 and toward the front side of the apparatus.

Each of the housings 3a, 3b is prismatic and open in the direction of the other and contains an infrared radiation source R1, R2 of high density output, each composed of two longitudinal tubes 7 parallel to the other and associated with a reflector concentrating the infrared radiation from the respective tube at the central part of the cooking zone A.

Figure 2:
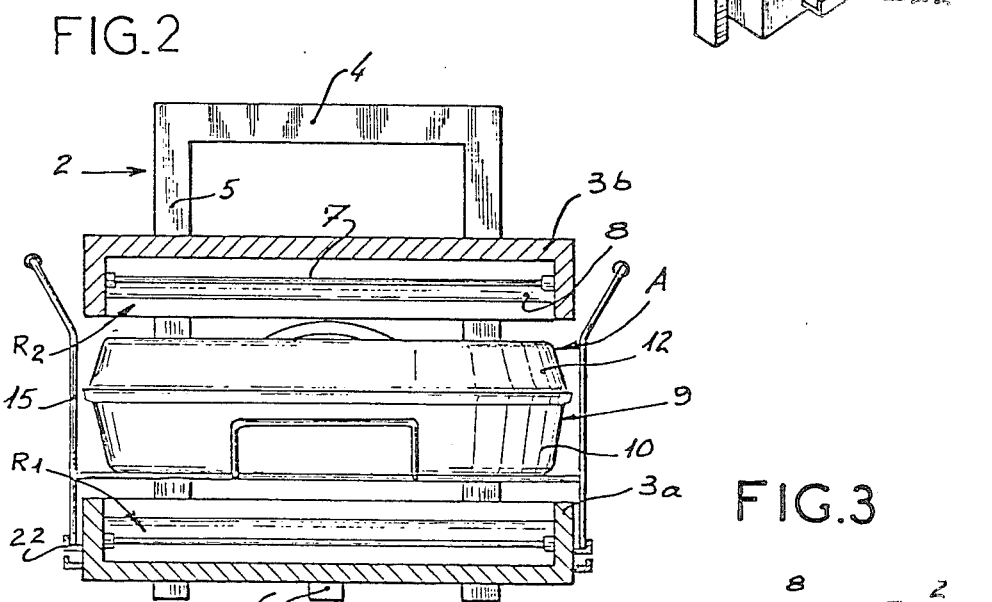
FIG. 2 is a vertical section through this apparatus with the rack and receptacle in place and seen looking toward the rear from the front.
Figure 3:
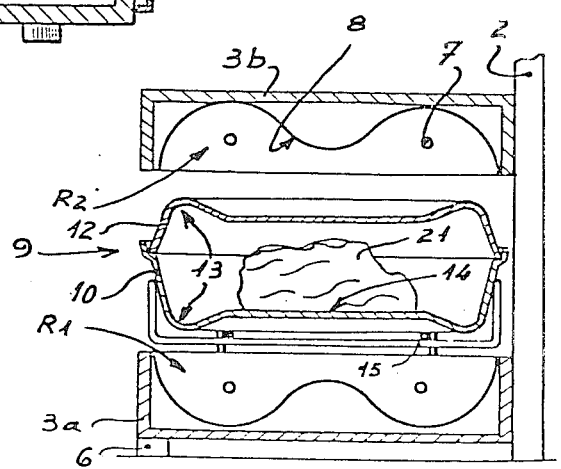
FIG. 3 is a vertical section taken in a plane perpendicular to that of FIG. 2.
Figure 4:
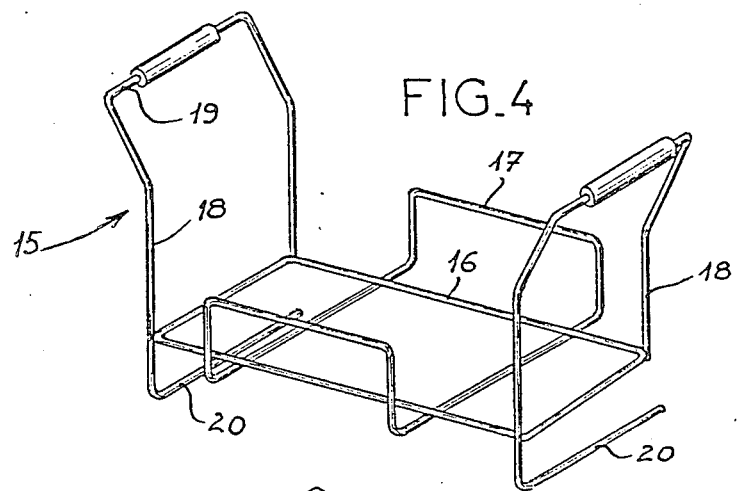
FIG. 4 is a perspective view of the rack, drawn to a somewhat larger scale than the scale of FIGS 1–3.

In other words, and as can be seen from FIGS. 2 and 3, the two radiation sources of the housings 3a and 3b are designed to irradiate with the maximum radiation density receptacle 9 disposed between them.

The radiation sources supply sufficient energy to vaporize the water in the receptacle.

The receptacle 9 is composed of two elements of different heights but which may be used interchangeably to hold the foodstuff and for that reason both are formed with central rises surrounded by peripheral troughs as will be discussed below.

In the orientation of the receptacle 9 shown in the drawing, it comprises an upwardly open bottom 10 and a cover 12 fitted tightly onto the bottom.

The bottom 10 and the cover 12 are formed of a material permeable to infrared radiation and absorbing it only slightly. A suitable material can be tempered glass or the like.

The difference in heights between the two elements allows them to be used interchangeable as the bottom or cover depending upon the size of the article of food to be cooked.

As shown in FIGS. 2 and 3, the external rims of the receptacle lie within the projections of the edges of the housings 3a and 3b in a horizontal plane so that there is no loss of heat to the surroundings.

FIG. 3 shows that the floor of each of the two elements 10, 12 of the receptacle is formed with a peripheral inwardly open groove or trough 13 which stores the water which is added for cooking purposes or collects as a result of condensation, the trough lying around the respective rise 14 upon which the food is carried.

The receptacle 9 is positioned so that the food article lies substantially midway between the two infrared heaters on a movable support or rack 15.

The rack 15 is composed of a horizontal frame 16 rigid with a pair of upwardly extending bails 17 which center on the rack in the lateral direction.

At its ends the support frame 16 is rigid with vertical posts 18 and the latter can be likewise extended upwardly to form respective bails providing handles 19. One at least of the uprights 18 can be extended downwardly below the frame 16 and provided with a bend to form a foot 20 by which the frame is supported above the counter top or table so that the rack 15 will hold the receptacle out of contact with the support surface, e.g. for serving.

Each of the transverse feet 20 can, in addition, cooperate with positioning means on the heating assembly, e.g. guide channels 22 into which the feet 20 can be inserted longitudinally. As can be seen from FIG. 2, two such channels 22 are provided at each transverse side with a lower housing 3ato position the rack at different levels so that depending upon the size of the food item, the horizontal median plane through it will lie proximal midway between the infrared heating sources R1 and R2.

The infrared sources are energized through a timer (not shown) by means of which the duration of cooking is determined. The timer circuitry can include an energy dosing switch, which interrupts intermittenly. The energization of the heaters to permit high and low glazing of certain foods at the end of cooking, especially pastry.

For cooking a foodstuff with this device it suffices to dispose the foodstuff 21 on the central rise 14 of the lower element 10 of the receptacle and to introduce into the lower trough 13 a small quantity of water, for example two tablespoons for most foods. The cover is then applied, the receptacle placed on the rack and on this rack 15 is introduced between two infrared sources.

The user should be careful to mount the rack on the channels 22 which position the foodstuff and the receptacle substantially equidistantly between the radiation sources R1 and R2.

The two sources are electrically energized so that their infrared means traverse the receptacle and very rapidly bring the water therein to the boiling point.

The water vapor thus formed condenses on the food and on the cooler walls of the receptacle, raising the temperature thereof.

The condensation droplets also absorb this radiation and are thus transformed into vapor so that there is a succession of evaporation/condensation cycles effected throughout the receptacle and also upon the surfaces of the foodstuff so that latent heat of condensation is transferred at an optimal level to the foodstuff to penetrate the latter. Direct infrared radiation is also interrupted by the foodstuff for superficial cooking.

The combination of direct infrared irradiation and cooking with steam ensures that the foodstuff will cook extremely rapidly.

During this cooking convective losses from the receptacle are minimized because of the small size of the latter and the fact that much of the cooking takes place before the temperature of the receptacle rises appreciably to allow convective losses. Thermal inertia losses are likewise minimized. Because of the transparency of the receptacle to visible light as well, the cooking operation can be monitored without interruption of the functioning of the device.

At the end of the cooking period, the rack and the receptacle are removed and the rack 15 can be handled without burning the user in spite of its metallic structure since the handle portions 19 lie well outside the cooking zone since the legs 20 also lie outside the cooking zone, the receptacle and its rack can be disposed directly on the food-serving surface.

The food may be consumed immediately or within a period of say 20 minutes without requiring reheating because of the stored calorific energy of the receptacle which is able to maintain the food hot.

Cooking is effected without grease or oil and without cleaning problems since, after use, the receptacle 9 only need be cleaned by standard techniques.

The quantity of water which is disposed in the receptacle depends upon the nature of the food. For dry foods, for example, spaghetti, this quantity should be of the order of thrice the weight of the spaghetti disposed in the receptacle while for other foods having intrinsic moisture, the quantity of water can be substantially less.

Of course, for foods with extremely high moisture content, sufficient moisture will be released upon the inception of infrared direct irradiation to bring about the evaporation/condensation cycles without addition of water from an external source, the condensation water collecting in the trough.

Table 1 attached hereto shows the comparative culinary results obtained in the cooking of numerous foods with the device of the invention with or without a steam pan in a classical furnace with a grill and in a microwave oven, all compared with the device of the invention. It will be apparent that the device of the invention provides results which are far superior to those which can be obtained by conventional means and indeed permits cooking of all kinds of foods in one device which is not the case with traditional cooking units. The cooking is effected in all cases without the addition of grease or oil and thus is highly advantageous for modern nutritional purposes.

Table 2 indicates the electric energy consumption of the four cooking techniques described in Table 1 for a given menu consisting of a food 1 which is a 1200 gram chicken or a 1200 gram rabbit or 12 quails.

Food 2 is a dozen tomatoes, peppers or stuffed squash. The results of the table show that steam cooking and classical oven cooking require a preheating and that these two cooking techniques as with a microwave oven, in order to serve a food at the same temperature as that which is obtained with the device of the invention requires a preheating of the plate for receiving the food and maintaining the temperature thereof.

The duration of energy consumption using a steam cooker and classical furnace with a grill, reduced by 20% based upon the controls provided, nevertheless far exceed those with the present invention. Table 2 therefore shows that the device of the invention utilizes much less electrical energy for a given result than the conventional approaches.

There are, of course, other advantages. For example the unit of the invention can be placed directly on a table top which permits monitoring the cooking operation during eating of cold foods, appetizers or the like, without being disturbed by vapor emissions or odors from the cooking receptacle.

Figure 5:
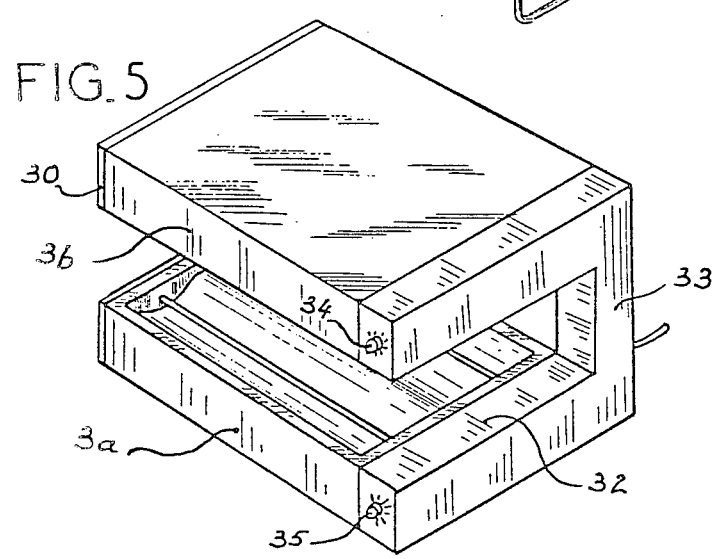
FIG. 5 is a front perspective view illustrating another embodiment of the invention.

The unit shown in FIG. 5 differs from that previously described in that the two housings 3a and 3b are constituted by two lateral elements 30, 32 connected to the ends of the two housings 3a and 3b.

Each of these generally U-shaped elements has a vertical bar 33 which fixes the housings in their spaced apart relationship.

One of the elements, for example the element 30, can be constituted of a plate while the other elements 32 has a tubular structure which permits, like with the chassis 2 of the prior embodiment, the passing of the energization wires to the infrared sources R1 and R2 through this element.

At the ends of this tubular member 32, the timers 34 and 35 can be provided to control each of the infrared sources.

Figure 6:
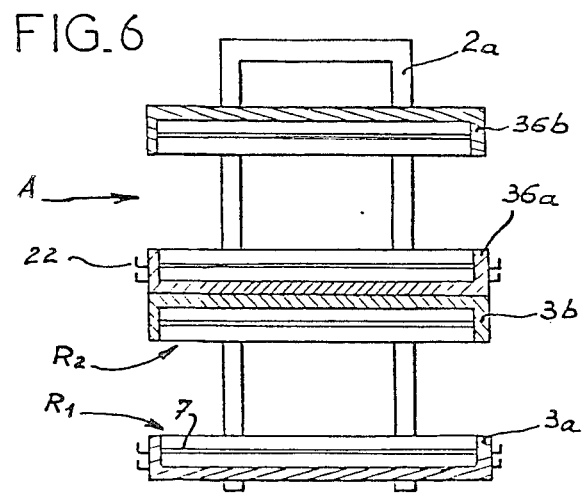
FIG. 6 is a view similar to FIG. 2 but illustrating a third embodiment of the invention.

In the embodiment of FIG. 6, two cooking units are provided so that in two receptacles respective foodstuffs can be cooked utilizing the same principles as those described.

Here the support 2a which is of the same type as the support 2 of FIG. 1 comprises two upper housings 36a, 36b and two lower housings 3a, 3b open toward one another and provided with respective infrared radiation sources so that each can be controlled independently of the other by respective timers. The receptacles are introduced on racks 15 via the respective journals 22.

The device of the invention has a number of advantages by comparison with conventional cooking techniques as detailed previously and which can be recapitulated here. This includes the ability to cook all kinds of foods regardless of their prior degree of preparation and whether they are frozen, have been defrosted or are not frozen products. The device uses substantially less energy and does not release odors or disagreeable vapors during cooking. The device permits continual monitoring of the progress of cooking and facilitates food service while allowing presentation of the food in its most attractive state.

It is also generally smaller in size than most cooking units, lighter in weight and certainly less problemmatical to operate, clean and use than conventional ovens.

TABLE 1

| | COMPARATIVE CULINARY RESULTS | | | |
|---|---|---|---|---|
| | Device of invention | Steam pan or simple pan | Standard oven with grill | Microwave oven |
| ALIMENTS 1 MEAT | | | | |
| Chicken | good | average (long and | average (if convection) | mediocre |

TABLE 1-continued

COMPARATIVE CULINARY RESULTS

| | Device of invention | Steam pan or simple pan | Standard oven with grill | Microwave oven |
|---|---|---|---|---|
| Lean duck | good | average (tedious cooking | average | unsuitable |
| Hare | average | average, long tedious | unsuitable | unsuitable |
| Roe | average | average | unsuitable | unsuitable |
| Pork roast | good | average not indicated | good | average |
| Pork rib | good | average | good with grill | mediocre |
| Hash | good | mediocre | mediocre | unsuitable |
| Roastbeef | good | average | good | mediocre |
| Beef Bourgignon | good | good | unsuitable | mediocre |
| Beef rib | good | unsuitable | average with grill | mediocre |
| Brain | good | unsuitable | unsuitable | mediocre |
| Veal ragout | good | good | unsuitable | mediocre |
| Leg of Mutton | good | unsuitable | good | unsuitable |
| FISH - CRUSTACEAN | | | | |
| Cod fish, unsalted | good | mediocre | unsuitable | mediocre |
| Salmon, poached | good | average | unsuitable | mediocre |
| Cod fish, frozen | good | average | mediocre (if moistened) | average |
| Filet de Sole | good | mediocre | mediocre | mediocre |
| Small Fry | average | average | unsuitable | unsuitable |
| Blue Trout | good | average | unsuitable | good |
| Crawfish | good | good | unsuitable | mediocre |
| Frog legs | good | average | unsuitable | unsuitable |
| Snails | good | unsuitable | good | mediocre |
| Lobster poached | good · | average | unsuitable | unsuitable |
| Shellfish St. Jacques | good | mediocre | good | unsuitable |
| ALIMENTS 2 | | | | |
| VEGETABLES (fresh, frozen or dry) | | | | |
| Potatoes in Jacket | average | good | unsuitable | mediocre |
| Potatoes gratin | good | unsuitable | good | unsuitable |
| Vegetable hotch potch | good | good | unsuitable | unsuitable |
| Green beans | good | good | unsuitable | average |
| Spinach fresh or frozen | good | average | unsuitable | mediocre (frozen only) |
| Small green kidney beans | good | good | unsuitable | unsuitable |
| Rice tapioca, oat flakes | good | good | unsuitable | mediocre |
| Potatoes with cauliflower steamed | good | good | unsuitable | average |
| FRUIT | | | | |
| Sweet appled | good | mediocre | good | mediocre |
| Peaches and Apricots | good | mediocre | unsuitable | mediocre |
| PASTAS | | | | |
| Spaghettis, ragliatellies, gnochis, raviolis, macaroni, polentes | good | average | unsuitable | mediocre |
| SIDE DISHES, PASTRY, DESSERTS | | | | |
| Pizza, quiches, tarts, clafoutis, cake Savoy, tart tatain | good | unsuitable | good | unsuitable |
| DISHES COMPOUND | | | | |
| Stuffed Tomatoes | good | mediocre | average | mediocre |
| White cabbage complete | good | unsuitable | average | unsuitable |
| Couscous with semolina | good | average | unsuitable | unsuitable |
| Paella | good | unsuitable | average | unsuitable |

TABLE 2

COMPARATIVE ENERGY CONSUMPTION

| | Device of invention | Steam pan | Standard oven with grill | Microwave oven |
|---|---|---|---|---|
| Nominal hourly consumption | 1400 W | 2000 W | 2500 W | 1400 W |
| Aliments 1 Observations | without preheating, finished, ready to serve, heat stored for 20 minutes | preheating 5 min., to return 10 min., cooking under pressure 20 min., keeping on hot plate, preservation 10 minutes | preheating 5 min, artificial convection cooking 60 min. (regulation of thermostat deducted), keeping on hot plate, preservation of heat 10 min. | cooked twice of appr. 600 g, 25 minutes each, keeping on hot plate and short preheating before serving the two portions 5 minutes |
| Time of consumption of energy | 25 minutes | 45 min.—20% regulation = 36 minutes | 75 min.—20% regul. = 60 minutes | 55 minutes |
| Consumption of energy | appr. 584 W | 1200 W | 2500 W | 1284 W |
| Aliments 2 Observations | without preheating, finished, ready to serve, heat stored for 20 minutes | Cooking 23 minutes, on hot plate, temperature preservation 10 minutes | preheating 10 min. cooking 30 min. preserv. 5 min. | Cooking 25 min. Reheating 3 min. |
| Time of consumption of energy | 18 minutes | 33 min.—20% regulation = 26.4 minutes | 45 min.—20% regulation = 36 minutes | 28 minutes |
| Consumption of energy | appr. 420 W | 880 W | 1500 W | 654 W |

TABLE 2-continued

| COMPARATIVE ENERGY CONSUMPTION | | | |
|---|---|---|---|
| Device of invention | Steam pan | Standard oven with grill | Microwave oven |
| 1004 W | 2080 W | 4000 W | 1944 W |

Total per meal: 1004 W / 2080 W / 4000 W / 1944 W

I claim:

1. A method of cooking a foodstuff which comprises the steps of:
    introducing said foodstuff into a vessel having an upwardly open infrared transparent bottom portion formed with a central rise upon which said foodstuff is disposed and surrounded peripherally by a trough adjoining a side wall of said bottom portion of said vessel;
    introducing a predetermined amount of water into said trough;
    closing said vessel with a downwardly concave infrared transparent cover having a planar portion closely with said foodstuff and substantially coextensive superposed with said rise and surrounded peripherally with a downwardly extending side wall substantially contiguous with said side wall of said bottom portion; and
    placing the closed vessel between two infrared radiating members at least coextensive with said vessel and subjecting the foodstuff to infrared irradiation through said vessel of a radiation power and frequency sufficient to bring water in said trough to a boil, thereby causing in repetitive evaporation/condensation cycles water to evaporate exclusively from infrared molecular activation and to condense on said foodstuff, cooking of said foodstuff by the in-depth penetration of heat into the foodstuff by the heat released by the condensation of water vapor on the foodstuff, and superficial cooking of the foodstuff by said infrared irradiation directly.

2. An apparatus for cooking a foodstuff, said apparatus comprising:
    a movable vessel for receiving a foodstuff to be cooked, said vessel comprising:
        an upwardly open infrared-radiation transparent bottom portion formed with a central rise upon which said foodstuff can be disposed, and surrounded peripherally by a trough adapted to receive a predetermined quantity of water at the inception of cooking,
        a downwardly concave infrared-radiation transparent cover having a planar portion adapted to be closely superposed with a foodstuff positioned on said rise and substantially coextensive therewith and surrounded peripherally by a side wall spaced from said foodstuff and substantially contiguous with a peripheral side wall of said bottom portion, said cover being closely fitted onto said bottom portion, and
        handles on at least said bottom portion of said vessel;
    a heating unit comprising:
        a lower infrared heater provided with at least one electrically operated infrared radiating member and at least coextensive with said bottom portion,
        an upper infrared heater provided with at least one electrically operated infrared radiating member spacedly juxtaposed with said lower heater and at least coextensive with said cover, and
        means supporting said vessel between said heaters in spaced relationship therefrom with said handles outside heating action zones of said heaters; and
    means for electrically energizing said members at a power and frequency sufficient to cause water in said vessel to boil and for a duration sufficient at least to cook said foodstuff on said rise superficially directly by infrared radiation, while simultaneously cooking the foodstuff in depth by heat released by condensation of steam on said foodstuff resulting from evaporation/condensation cycles induced by the infrared radiation.

3. The apparatus defined in claim 2 wherein each of said heaters comprises a prismatic casing open toward the prismatic casing of the other heater, a respective reflector received in each casing, and means mounting the respective member in juxtaposition with the respective reflector, said apparatus further comprising a common support for said casings.

4. The apparatus defined in claim 2 wherein said handles are formed on stirrups extending upwardly from a support frame at opposite ends thereof, said frame having along opposite longitudinal sides thereof respective upstanding formations for retaining said bottom portion on said frame, each of said stirrups having a rod-like foot slidably guided on selected ledges on said lower heater for vertically positioning sai vessel between said heaters.

* * * * *